US008550288B2

(12) United States Patent
Briar et al.

(10) Patent No.: US 8,550,288 B2

(45) Date of Patent: Oct. 8, 2013

(54) BEVERAGE CONTAINER WITH ELECTRONIC IMAGE DISPLAY

(75) Inventors: Scott Michael Briar, Kansas City, MO (US); William Scott, Kansas City, MO (US)

(73) Assignee: Scott & Scott Enterprises, LLC, Kansas City, MO (US)

( * ) Notice: Subject to any disclaimer, the term of this patent is extended or adjusted under 35 U.S.C. 154(b) by 0 days.

(21) Appl. No.: 13/276,967

(22) Filed: Oct. 19, 2011

(65) Prior Publication Data

US 2013/0103463 A1 Apr. 25, 2013

(51) Int. Cl.

| | |
|---|---|
| ***B65D 1/40*** | (2006.01) |
| ***B65D 25/54*** | (2006.01) |
| ***G06Q 30/00*** | (2012.01) |
| ***F16K 21/18*** | (2006.01) |

(52) U.S. Cl.

USPC ........ 220/664; 705/14.4; 220/62.12; 137/386

(58) Field of Classification Search

USPC .......................................... 705/14.4; 137/803

See application file for complete search history.

(56) References Cited

U.S. PATENT DOCUMENTS

| | | | | |
|---|---|---|---|---|
| 3,643,219 | A * | 2/1972 | Heimann | 345/26 |
| 4,330,702 | A * | 5/1982 | Cheng | 219/492 |
| 4,382,382 | A * | 5/1983 | Wang | 73/304 R |
| 5,339,548 | A | 8/1994 | Russell | |
| 5,678,925 | A | 10/1997 | Garmaise | |
| 6,140,932 | A | 10/2000 | Frank et al. | |
| 6,419,384 | B1 | 7/2002 | Lewis | |
| 6,591,524 | B1 | 7/2003 | Lewis et al. | |
| 7,900,384 | B2 | 3/2011 | Schnuckle | |
| 2002/0175158 | A1 | 11/2002 | Sanoner et al. | |
| 2006/0261233 | A1 | 11/2006 | Williams et al. | |
| 2008/0034627 | A1 | 2/2008 | Schnuckle | |
| 2008/0262932 | A1 | 10/2008 | Wareham | |
| 2009/0206084 | A1 | 8/2009 | Woolf et al. | |
| 2010/0045705 | A1 * | 2/2010 | Vertegaal et al. | 345/661 |
| 2010/0182518 | A1 * | 7/2010 | Kirmse et al. | 348/836 |
| 2010/0300913 | A1 | 12/2010 | Goldburt | |
| 2010/0321638 | A1 | 12/2010 | Schnuckle | |
| 2010/0321778 | A1 | 12/2010 | Schnuckle | |
| 2010/0321797 | A1 | 12/2010 | Schnuckle | |
| 2011/0050431 | A1 | 3/2011 | Hood et al. | |
| 2011/0088296 | A1 | 4/2011 | Schnuckle | |

OTHER PUBLICATIONS

"Use your TV Remote to Turn on Your Computer", Starlino Electronics, Dec. 20, 2008, found on line at www.starlino.com/remote_pc_switch.html.*

PCTSearch Report dated Jan. 10, 2013 re PCT/US12/60807.

* cited by examiner

*Primary Examiner* — John G Weiss

*Assistant Examiner* — Scott C Anderson

(74) *Attorney, Agent, or Firm* — Shook, Hardy & Bacon L.L.P.

(57) ABSTRACT

A beverage container with an electronic display device and methods for its use are described. The beverage container includes an electronic display device disposed in a sidewall of the container and a control module disposed in a hollow base portion. A liquid sensor senses the presence of a liquid in the container and a motion sensor is provided to sense movements of the container caused by, for example, transporting, holding, or drinking from the container. When the control module receives appropriate signals from the liquid and motion sensors an image or video is displayed on the display device. The container is thus useable to display pictures, videos, slide shows, advertisements, or the like in personal or commercial applications. A communications port is also provided to enable coupling of the container with a computing device for management of images and videos displayed on the container.

20 Claims, 10 Drawing Sheets

BEVERAGE CONTAINER WITH ELECTRONIC IMAGE DISPLAY

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed Description section below. This summary is not intended to identify key features or essential features of the claimed subject matter, nor is it intended to be used as an aid in isolation to determine the scope of the claimed subject matter.

In brief and at a high level, this disclosure describes, among other things, a beverage container with an electronic display device for displaying images or videos and methods for its use. The beverage container comprises a receptacle for holding and facilitating the drinking of a liquid beverage and may take the form of a mug, cup, bottle, bowl, pitcher, jug, vase, or glass and includes an electronic display device, such as an LCD (liquid crystal display) screen that is disposed in a sidewall of the container. A control module is also disposed in the container to store and control presentation of images and/or videos on the display device. The control module employs at least a liquid sensor, and may also include a motion sensor, to determine when to display content on the display device. Images, videos, and configuration settings for the control module are received via an integrated communications port in the beverage container that provides communicative coupling with a computing device.

DESCRIPTION OF THE DRAWINGS

Illustrative embodiments of the invention are described in detail below with reference to the attached drawing figures, and wherein.

DETAILED DESCRIPTION

Figure 2:
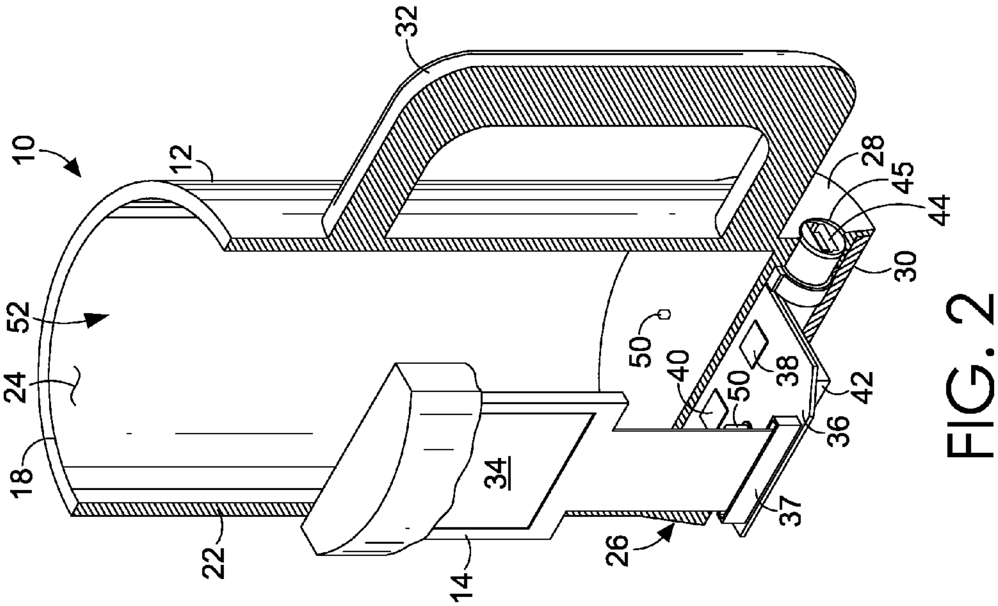
FIG. 2 is a view of the beverage container of FIG. 1, but with the container in cross-section to reveal some of the electrical components in accordance with an embodiment of the invention.
Figure 1:
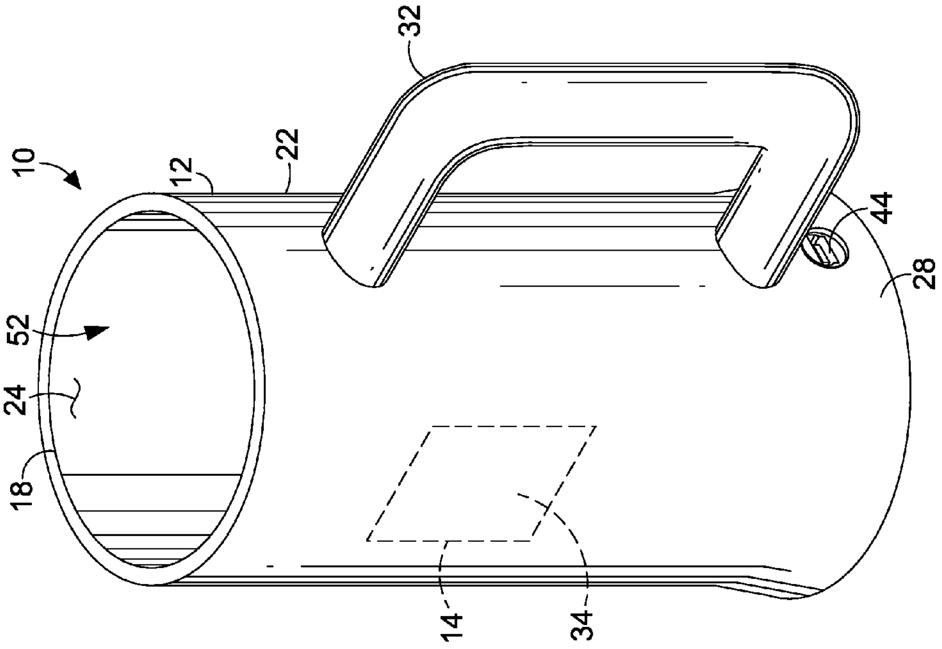
FIG. 1 is a perspective view of a beverage container with an electronic display device in accordance with an embodiment of the invention.
Figure 4:
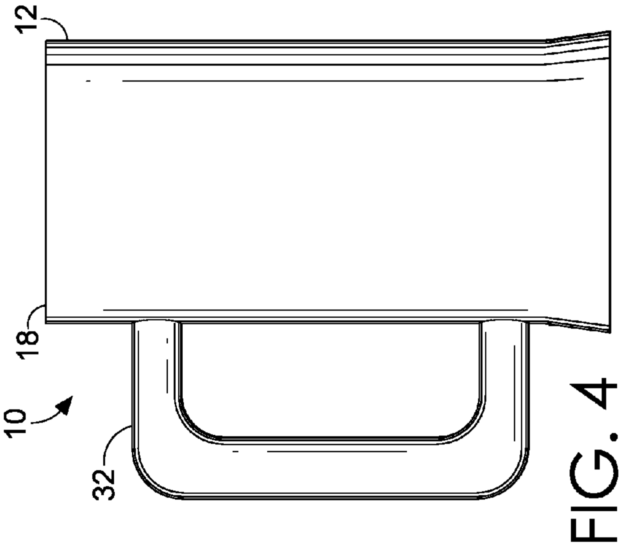
FIG. 4 is a rear side elevational view of the beverage container of FIG. 1 in accordance with an embodiment of the invention.
Figure 6:
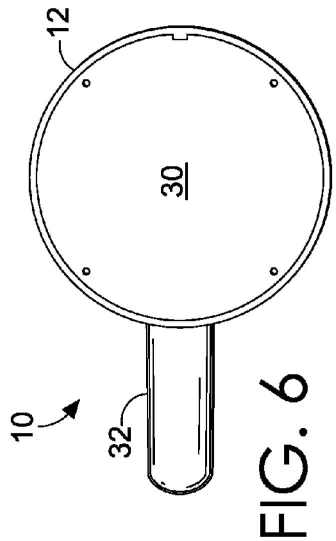
FIG. 6 is a bottom plan view of the beverage container of FIG. 1 in accordance with an embodiment of the invention.
Figure 3:
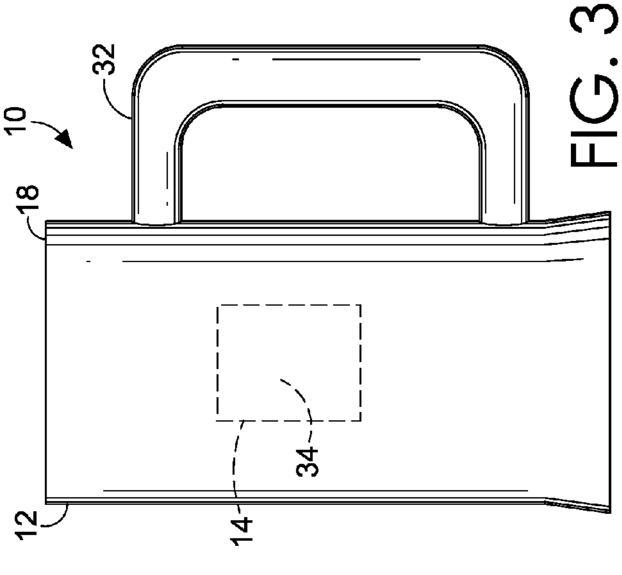
FIG. 3 is a front side elevational view of the beverage container of FIG. 1 in accordance with an embodiment of the invention.
Figure 5:
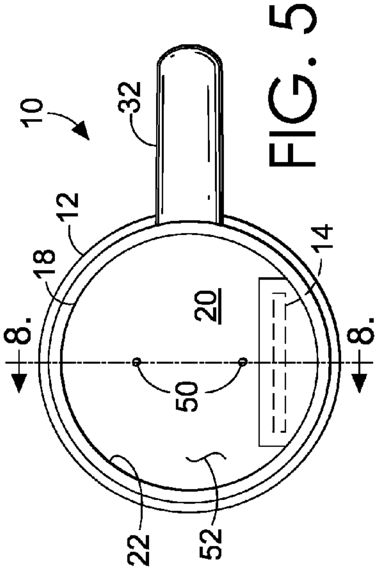
FIG. 5 is a top plan view of the beverage container of FIG. 1 in accordance with an embodiment of the invention.
Figure 7:
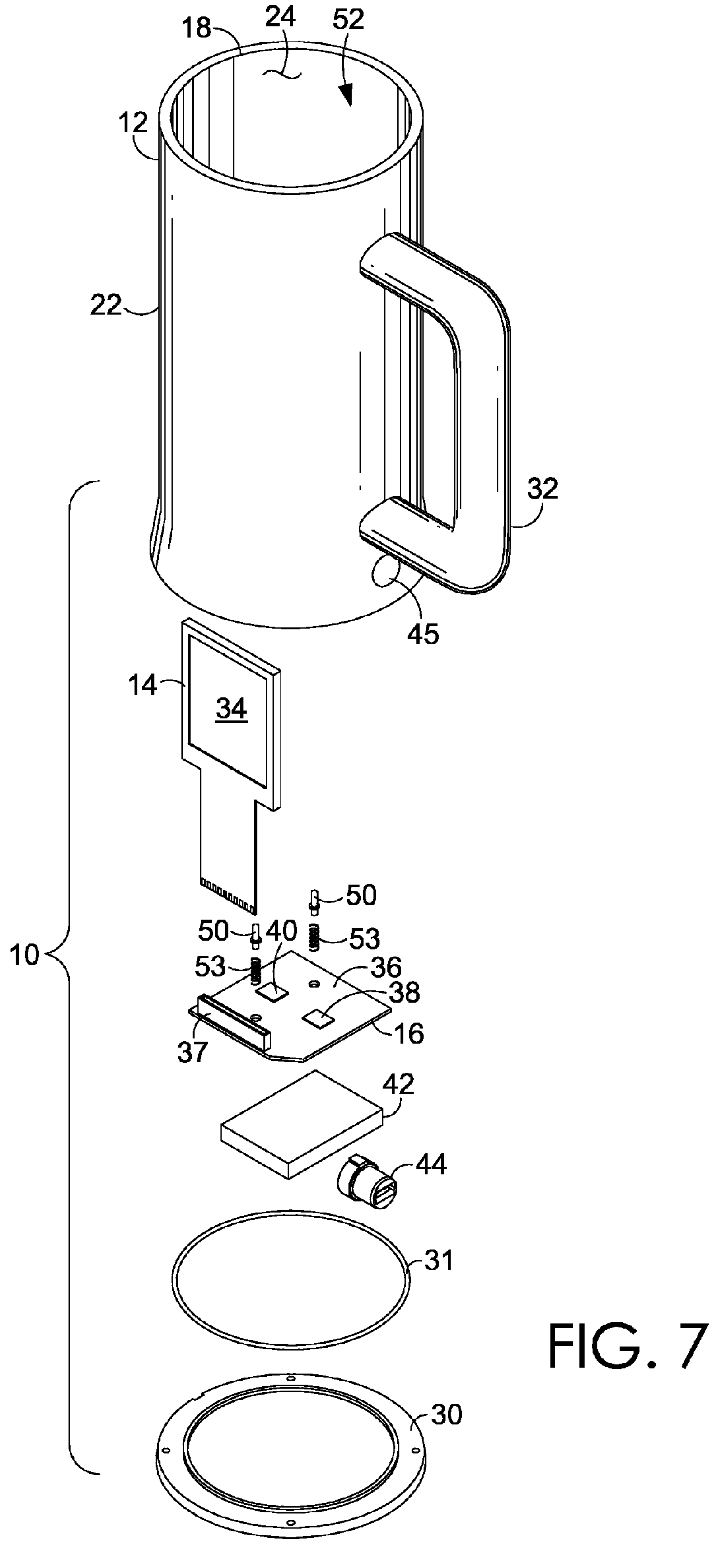
FIG. 7 is an exploded perspective view of the beverage container of FIG. 1 in accordance with an embodiment of the invention.
Figure 8:
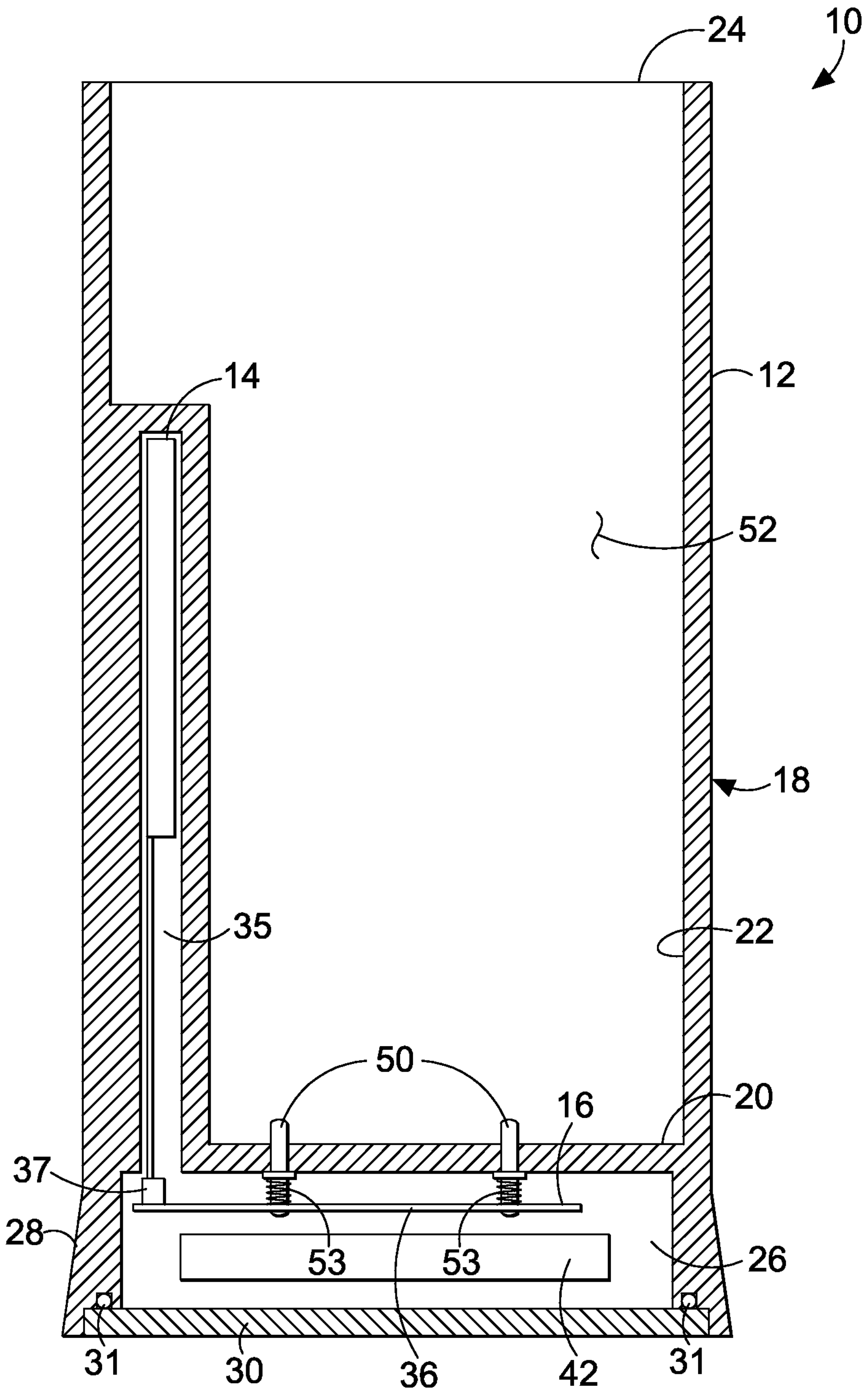
FIG. 8 is a right side elevational view in partial cross-section along line 8-8 depicted in FIG. 5 of the beverage container of FIG. 1 in accordance with an embodiment of the invention.
Figure 9:
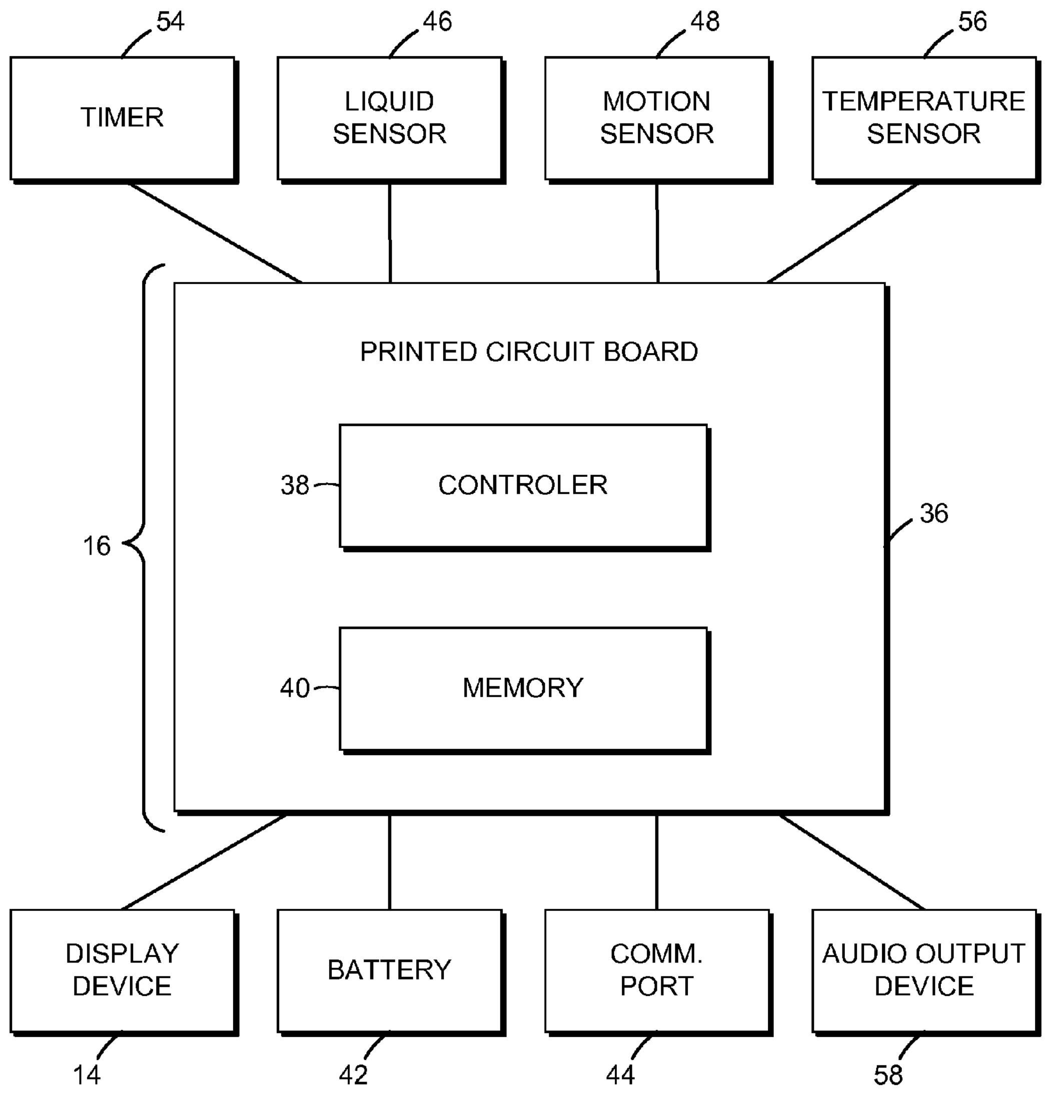
FIG. 9 is a schematic block diagram depicting components of the beverage container of FIG. 1 in accordance with an embodiment of the invention.

The subject matter of select embodiments of the invention is described with specificity herein to meet statutory requirements. The description itself, however, is not intended to necessarily limit the scope of claims. Rather, the claimed subject matter might be embodied in other ways to include different steps, components, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention include beverage containers with an electrical display device and methods for their use and operation. With reference initially to FIGS. 1-9, a beverage container 10 is described in accordance with an embodiment of the invention. It is recognized that the manufacture of the components of the container 10 may be completed by a variety of methods and from a variety of materials known in the art. All such methods and materials are not described herein so as not to obscure the description. However, all such methods and materials are understood as being within the scope of embodiments of the invention described herein.

The container 10 includes a body 12 with a display device 14 and a control module 16 disposed therein. The body 12 is depicted in FIGS. 1-9 as resembling a mug; however, the body 12 is configurable to provide any desired form of liquid receptacle. For instance the body 12 might be a cup, bottle, bowl, pitcher, jug, vase, glass, bucket, or the like. In an embodiment, the body 12 is made from a shatterproof acrylic resin but may be made from any desired materials including, for example, plastics, glass, ceramics, metal, and the like. The body 12 may be transparent, translucent, opaque, or a combination thereof.

As depicted in FIGS. 1-9, the body 12 includes a liquid retaining portion 18 formed by a closed first end 20, a sidewall 22, and an open second end 24. The closed first end 20 divides the interior of the sidewall 22 into the liquid retaining portion 18 and a hollow base portion 26 that is opposite the closed first end 20 from the liquid retaining portion 18. The hollow base portion 26 is formed by the closed first end 20 and a portion of the sidewall 22 that extends beyond the closed first end 20 to form an annular flange 28. A base plate 30 is coupled across the flange 28 to enclose the hollow base portion 26. One or more O-rings 31 may be included to provide a water-tight seal between the base plate 30 and the flange 28. In an embodiment, the body 12 also includes a handle 32 extending from the sidewall 22.

The display device 14 is any available electronic display device technology, such as an LCD (liquid crystal display), an OLED (organic light emitting diode), or an OEL (organic electro-luminescent) display, among others. The display device 14 includes a display screen 34 that, when illuminated, is visible from a position outside the beverage container 10. In an embodiment, the display screen 34 is additionally or alternatively visible within the interior 52 of the liquid retaining portion 18. In another embodiment, a plurality of display devices 14 or display screens 34 are incorporated into the beverage container 10.

The display device 14 is disposed within a portion of the sidewall 22. In an embodiment, the display device 14 is molded into the sidewall 22 or is inserted within a hollow or recess 35 in the sidewall 22. The display screen 34 is fully enclosed by the sidewall 22 or may be exposed to the environment at a surface of the sidewall 22. One or more layers or coatings might be disposed over the display screen 34 to protect it from damage and/or to increase visibility of images displayed thereon. And, in an embodiment, when the sidewall 22 is constructed from a translucent or opaque material, a portion of the sidewall corresponding with the display screen 34 may be configured to have greater transparency so as to increase visibility of the display screen 34 through that portion of the sidewall 22 or, alternatively, the sidewall may have a portion of the sidewall cutaway such that it frames the display.

The display device 14 has any desired dimensions and configuration suitable for use with a selected configuration of the body 12. For example, the display device 14 might employ a display screen 34 that has an approximately two inch diagonal length, as depicted in FIGS. 1-9. Alternatively, the display device 14 might provide a display screen 34 that encompasses any portion of the sidewall 22 or that wraps around all or part of the circumference of the sidewall 22.

The control module 16 is disposed within the hollow base portion 26 and is in electrical communication with the display device 14, such as via a coupling 37. The control module 16 includes a controller 38 and a memory 40 coupled to a printed circuit board 36. The controller 38 comprises one or more logic chips, processors, or similar components configured to carry out functions as described herein.

The memory 40 includes any form of computer memory or computer-readable storage media usable by the controller 38. Computer-readable media includes media that is volatile, nonvolatile, removable, and nonremovable. Computer-readable media includes media implemented in any way for storing information, such as images, videos, audio files, application files, instructions, data structures, program modules, and other data representations. Media examples include RAM (random-access memory), ROM (read-only memory), EEPROM (electrically-erasable programmable read-only memory), flash memory or other memory technology, holographic media or other optical disc storage, magnetic cassettes, magnetic tape, magnetic disk storage, and other magnetic storage devices. These technologies can store data momentarily, temporarily, or permanently. In one possible embodiment, the memory 40 is a thirty-two megabyte flash memory card.

A battery 42 is also disposed in the hollow base portion 26 and is electrically coupled to the control module 16. The battery 42 provides electrical power for operation of the control module 16. The battery 42 is rechargeable and/or disposable. The battery 42 includes one or a plurality of individual batteries coupled in any desired configuration. The battery 42 employs dry-cell, wet-cell, or other forms of battery technology.

A communications port 44 is associated with the control module 16 for enabling wired communications between the control module 16 and a separate computing device. The communications port 44 is electrically coupled to the control module 16 and is disposed within the hollow base portion 26. In the illustrated embodiment, the communications port 44 is a USB (universal serial bus) receptacle into which a USB plug can be inserted for coupling with the disparate computing device. The USB technology includes any available version of USB connectivity technology including versions 1.0-3.0 as well as any form of USB connection, e.g. standard, mini, and micro adapters/receptacles of types A and B. The communications port 44 might alternatively employ any other available communications technology and/or receptacles like, for example FireWire, Thunderbolt, Ethernet, or PictBridge. In another embodiment, the communications port 44 may be omitted and wireless communications such as via infrared or radio transmissions may be used to transfer data to and from the control module from the separate computing device.

As depicted in FIGS. 1-9, the communications port 44 is accessible through an aperture 45 in the annular flange 28. The communications port 44 is also configured to be water resistant or watertight such that liquids are not able to access the interior of the hollow base portion 26 through the communications port 44 or between the port 44 and the annular flange 28.

A liquid sensor 46 configured to sense the presence of liquid within the liquid retaining portion 18 of the body 12 is also provided. In an embodiment, the liquid sensor 46 includes a pair of metal probes 50 that extend into an interior 52 of the liquid retaining portion 18. In an embodiment, the probes 50 extend from the closed first end 20 into the interior 52 of the liquid retaining portion 18. The probes 50 are electrically coupled to the liquid sensor 46 via a pair of springs 53 that are each in contact with a respective one of the probes 50 and with a contact on the printed circuit board 36 associated with the liquid sensor 46. In another embodiment, the probes 50 are coupled to the liquid sensor 46 by one or more wires or other couplings.

The liquid sensor 46 is configured to provide a signal to the control module 16 that indicates the presence or absence of a liquid in the beverage container, as described more fully below. In another embodiment, the liquid sensor 46 includes a switch that is inline with an electrical circuit between the battery 42 and the printed circuit board 36. As such, when a liquid is sensed between the probes 50, the switch is closed to complete the electrical circuit and to supply power to the control module 16. When a liquid is not sensed, the switch is open and the control module is not powered or is powered off.

The control module 16 may also be supplied with a motion sensor 48. The motion sensor 48 comprises any available motion detection apparatus. These include, for example and not limitation, piezoelectric, vibration, acoustic, optical, mechanical, and/or magnetic sensors that are configured to sense movements of the beverage container 10. The motion sensor 48 is disposed in the hollow base portion 26 and is electrically coupled to the control module 16 for receiving electrical power and for communicating a signal indicating detection of motion. In another embodiment, the motion sensor 48 is disposed in any available location within the body 12 of the beverage container 10.

In an embodiment, the control module 16 also includes a timer component 54. The timer component 54 is configured to measure an elapsed time from the occurrence of an event.

A temperature sensor 56 might also be included. The temperature sensor 56 is configured to measure one or more of the temperature of a liquid disposed in the beverage container 10, the temperature of the sidewall 22 or closed first end 20, or an environmental temperature.

In another embodiment, the beverage container 10 includes an audio output device 58, such as a speaker. The audio output device 58 is configured to provide one or more audible outputs including sounds, beeps, chirps, music, and/or voice, among others. Such audible outputs may be a component of a video file displayed by the display device 14 or might be selected to accompany a displayed video or image. Audio files are stored in the memory 40 similarly to the image and video files and may be presented based on the same or different conditions as the image and video files, as described below.

Figure 10:
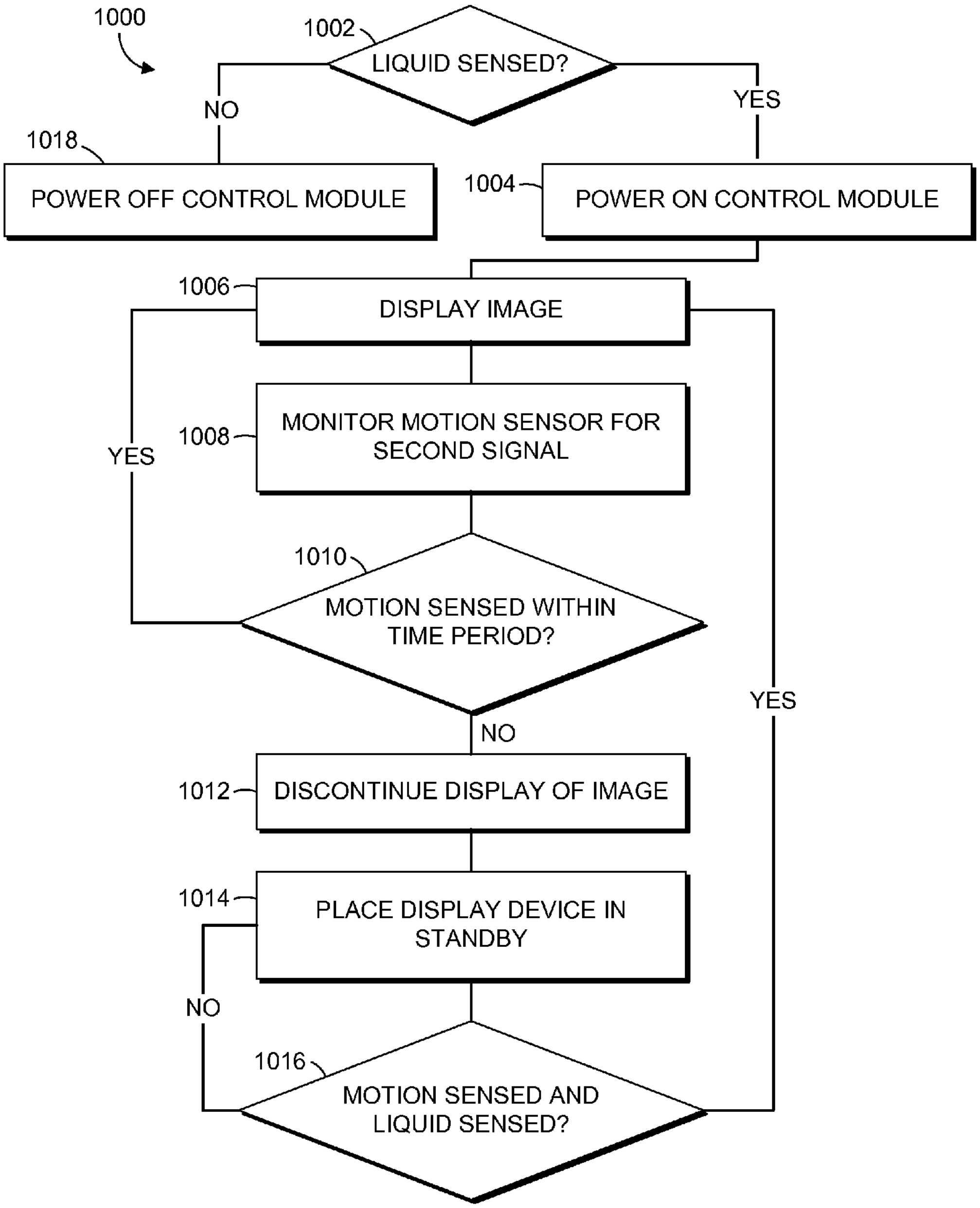
FIG. 10 is flow diagram depicting a method for presenting an image on a beverage container in accordance with an embodiment of the invention.

Turning now to FIG. 10, a method 1000 for presenting an image on the beverage container 10 is described in accordance with an embodiment of the invention. Initially, a consumable liquid or beverage is placed into the liquid retaining portion 18 of the beverage container 10. At a step 1002, the presence of the liquid in the liquid retaining portion 18 is sensed by the liquid sensor 46. In an embodiment, the liquid sensor 46 senses a change in the electrical resistance between the pair of probes 50. In another embodiment, the liquid sensor 46 might sense another electrical property change such as current or voltage. Or, the liquid sensor 46 might be configured to sense the presence of the liquid based on a change in pressure on a surface of the interior 52 of the liquid retaining portion 18, an acoustical property, or an infrared property, among others.

Upon sensing the presence of the liquid, the liquid sensor 46 provides a first signal to the control module 16 at step 1004. The first signal comprises any indication useable by the control module 16. For instance, the first signal might be an analog voltage reading or a digital communication. In an embodiment, the first signal comprises a completion of an electrical power supply circuit to supply electrical power to the control module 16, e.g. the liquid sensor 46 completes the electrical circuit to power on the control module 16 when the presence of the liquid is sensed. In an embodiment, the control module 16 is in a low-power sleep state prior to receiving the first signal or is completely powered off.

The control module 16, having received the first signal from the liquid sensor 46 is fully powered on and displays an image on the display device 14, as indicated at step 1006. The image includes any graphic, photograph, drawing, video, or other rendering stored in the memory 40 in any electronic form, e.g. JPEG (Joint Photographic Experts Group) or TIFF (Tagged Image File Format). The control module 16 may display a single image continuously (or a video in repetition) or a plurality of images can be displayed in succession, such as in a slide show format. In an embodiment, configurations settings are stored in the memory 40 and instruct the display of the image(s).

At a step 1008, the control module 16 monitors for a second signal from the motion sensor 48 that indicates a sensed movement of the beverage container 10. The monitoring may be continuous or periodic. The second signal, like the first signal provided by the liquid sensor 46, employs any communication useable by the control module 16. In an embodiment, the motion sensor 48 and/or the second signal provided thereby is configurable based on an amount, intensity, or type of movement required to cause the second signal to be provided. For example, the motion sensor 48 might be configured to sense the slightest nudge of the beverage container 10 or, a more intense bump caused by, for example, the beverage container 10 being placed on a hard surface might be required. Or the motion sensor 48 might be configured to sense tilting of the beverage container 10 but not lateral movements thereof.

In an embodiment, while monitoring for the second signal, the control module 16 also initiates the timer 54 to measure a period of time. The period of time is measured from the display of the image at the step 1006. Or the period of time is measured from the receipt of an initial first signal from the liquid sensor. The measured period of time is compared to a predetermined duration stored in the memory 40. At a step 1010, when the second signal is received from the motion sensor 48 within the predetermined duration, the display of the image(s) continues, as indicated by returning to the step 1006, and the timer is reset upon receipt of the second signal.

Alternatively, when the predetermined duration elapses prior to receipt of the second signal from the motion sensor 48 then display of the image(s) is discontinued, as indicated at a step 1012. And at a step 1014, the display device 14 is placed in a standby mode. In standby mode, power supplied to the display device 14 is minimized or eliminated so as to conserve life of the battery 42.

Monitoring of the motion sensor 48 continues while the display device 14 is in standby mode. While no movement of the beverage container 10 is sensed, the display device 14 is maintained in the standby mode, as indicated by returning to the step 1014 from a step 1016. When a motion is sensed and the second signal is received by the control module 16, the display device 14 is again fully powered on and the image(s) displayed, as indicated by returning to step 1006 from step 1016.

In an embodiment, the control module 16 also monitors the first signal from the liquid sensor 46 throughout the steps of the method 1000, as indicated by steps 1002 and 1016. As such, at any point when the first signal from the liquid sensor 46 is lost—indicating that the beverage container 10 is empty—the display device 14 and the control module 16 are powered off until the first signal is restored. In an embodiment, loss of the first signal from the liquid sensor 46 cuts power to the control module 16. Alternatively, the control module 16 is placed in a sleep mode upon loss of the first signal. Sleep mode comprises for example, a low power-consumption mode in which the control module 16 uses only an amount of power necessary to monitor for the first signal and to retain data in the memory 40.

In another embodiment, the control module 16 observes a delay for a predetermined amount of time following the loss of the first signal from the liquid sensor 46 before powering off/sleeping. Such a delay may compensate for the liquid sloshing around within the container and loosing contact with the probes 50. Or the delay might be used to display a new image on the display device 14 informing a user that their drink is empty or of available drink specials.

Figure 11:
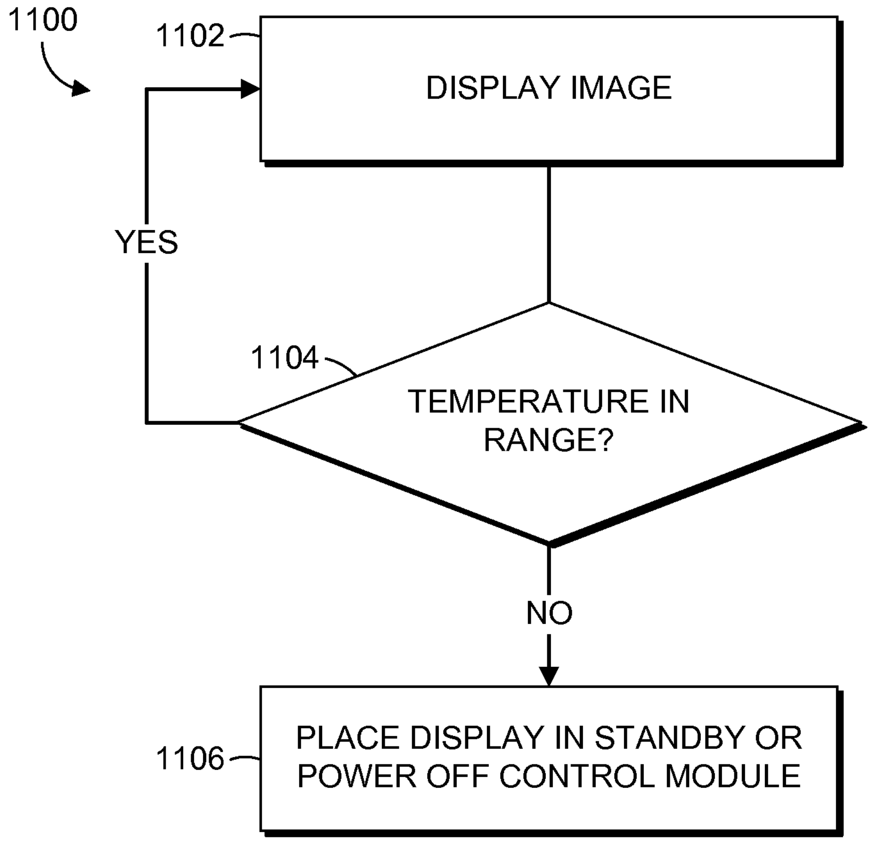
FIG. 11 is a flow diagram depicting a method for using a temperature measurement for presenting an image on a beverage container in accordance with an embodiment of the invention.

With additional reference to FIG. 11, a temperature measurement is employed in an embodiment of the invention. At a step 1102, an image is displayed by the display device 14 as described in accordance with the method 1000. One or more temperature measurements are received by the control module 16 from the temperature sensor 56. The temperature(s) is that of the liquid disposed in the beverage container 10, the sidewall 22 or closed first end 20, or of the environment surrounding the beverage container 10, among other temperatures that might be measured.

At a step 1104, the control module 16 determines whether the temperature(s) is within a desired range, and if so, display of the image continues. When the temperature(s) is determined not to be within the desired range, the display device and/or the control module 16 is placed in standby mode or powered off, as indicated at a step 1106.

The desired range of the temperatures is configurable based on the temperature measurements that are provided and based on the actual measurement. For example, the temperature of the liquid in the container 10 might be measured and compared to a predetermined degree. Alternatively, the temperatures of the liquid and the sidewall 22 of the container might be measured and compared. Thus, when a cold beverage becomes warm or becomes the same temperature as the sidewall 22 of the container 10 the display device might be placed in standby mode/powered off. Such temperature measurements might be indicative of the beverage container 10 no longer being in use because, for example, the container 10 has been left behind by a restaurant patron. The display device 14 can thus be placed in standby mode/powered off to conserve battery life. As another example, a measurement of an environmental temperature that is very warm or very cold might be employed to determine that a particular advertisement should be provided via the display device 14, e.g. a cold drink advertisement on a hot day.

Figure 12:
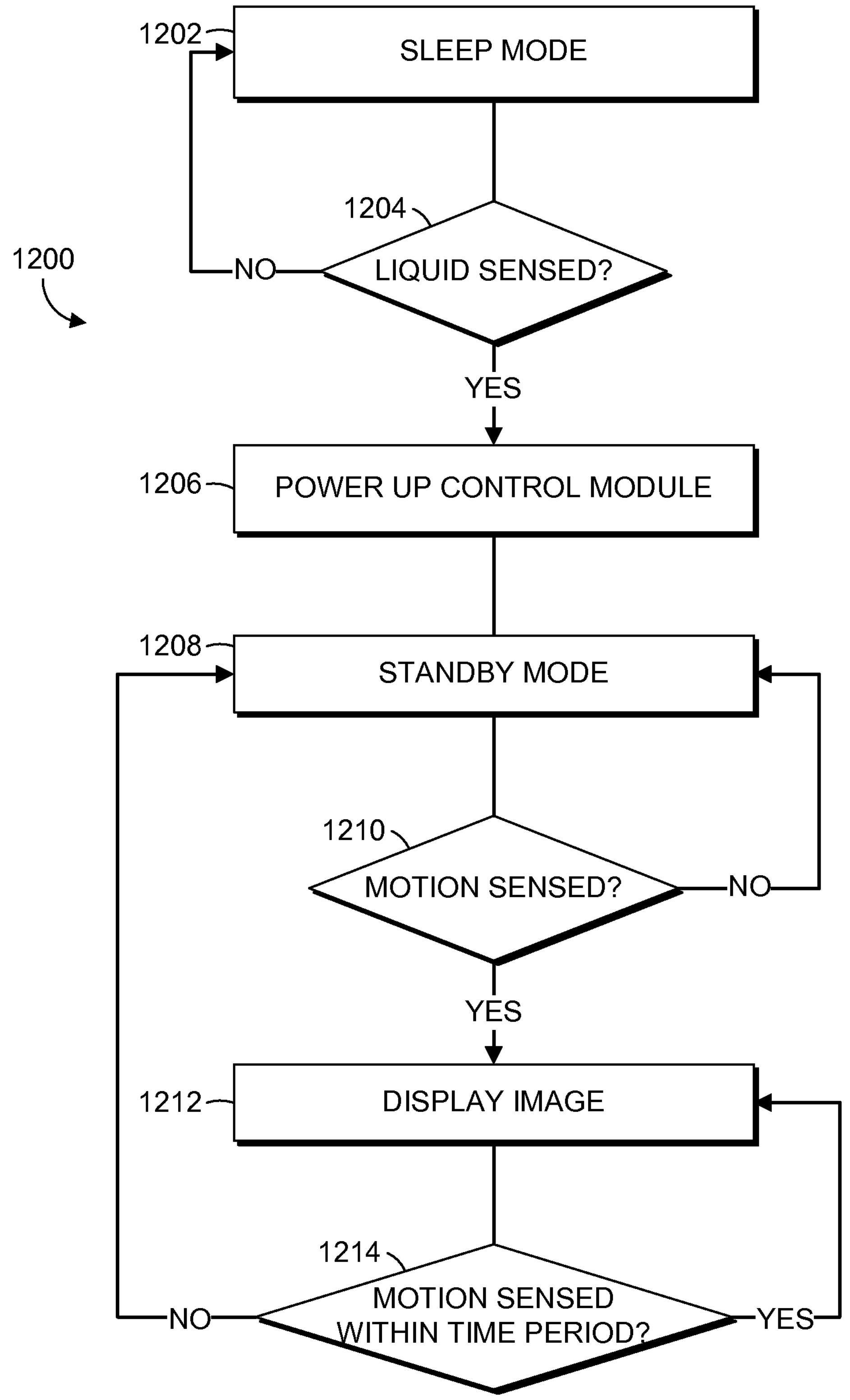
FIG. 12 is a flow diagram depicting another method for presenting an image on a beverage container in accordance with an embodiment of the invention.

With reference to FIG. 12, a method 1200 for presenting an image on the beverage container 10 is described in accordance with an embodiment of the invention. Initially, the beverage container 10 is in a sleep mode as indicated at a step 1202. As described previously, sleep mode provides minimal battery 40 usage during storage and/or non-use of the beverage container 10. In sleep mode the control module 16 monitors the liquid sensor 46 for the first signal indicating the presence of a liquid in the beverage container 10, as indicated at a step 1204. When no liquid is sensed, the control module 16 remains in sleep mode as indicated by returning to the step 1202.

When the liquid sensor detects the presence of a liquid in the beverage container 10 the first signal is provided to the control module 16. The control module 16 fully powers up, as indicated at a step 1206, and enters a standby mode, as indicated at a step 1208. In standby mode, power is provided to the motion sensor 48 to monitor for movements of the beverage container 10 but, no image is displayed on the display device 14. While no motion is sensed by the motion sensor 48, the control module 16 and display device 14 remain in standby mode as indicated by returning to the step 1208.

When motion is sensed by the motion sensor 48, a second signal is provide to the control module 16 and an image is displayed on the display device 14, as indicated at a step 1212. The control module 16 continues to monitor for sensed motions by the motion sensor 48 and, if none are sensed within a predetermined period of time, the control module 16 and display device 14 again assume standby mode as indicated at a step 1214 and by returning to the step 1208. If motion is sensed within the predetermined period of time then the image(s) continue to be displayed, as indicated by returning to the step 1212.

Figure 13:
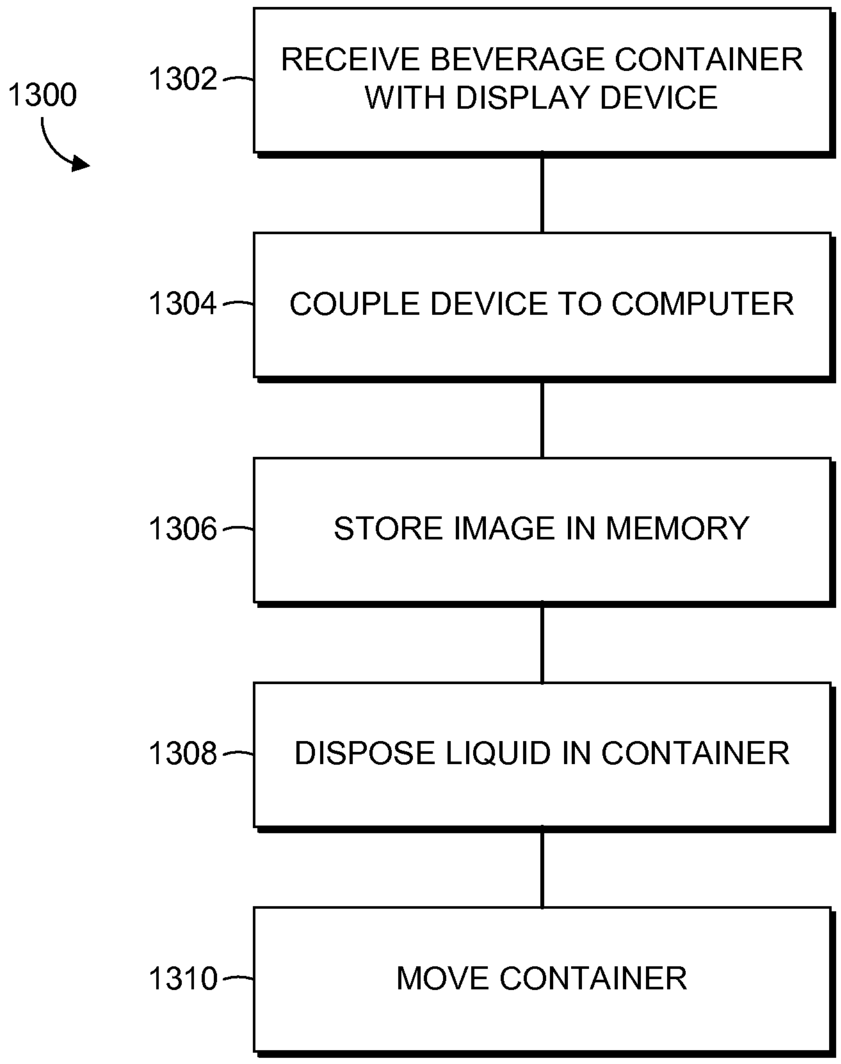
FIG. 13 is a flow diagram depicting a method for advertising on a beverage container having an electronic display device in accordance with an embodiment of the invention.

With reference now to FIG. 13, a method 1300 for advertising on a beverage container is described in accordance with an embodiment of the invention. At a step 1302, the beverage container 10 is received. In an embodiment, the beverage container 10 is received in a shipping mode in which the control module 16 and all other components therein are powered off. To activate the beverage container 10 from the shipping mode the control module 16 is coupled to a computing device, such as a personal computer, laptop, handheld device, or other computing device, via the communications port 44, as indicated at a step 1204. In an embodiment, a USB cable is plugged into the communications port 44 and into a receptacle on the computing device.

An associated software package is automatically downloaded from the memory 40 of the control module 16 to the computing device to aid in the configuration and operation of the beverage container 10. In another embodiment, the software package is downloaded from a network, such as the Internet, or is provided on a computer-readable media that accompanies the beverage container 10. In another embodiment, no software package is employed.

Figure 14:
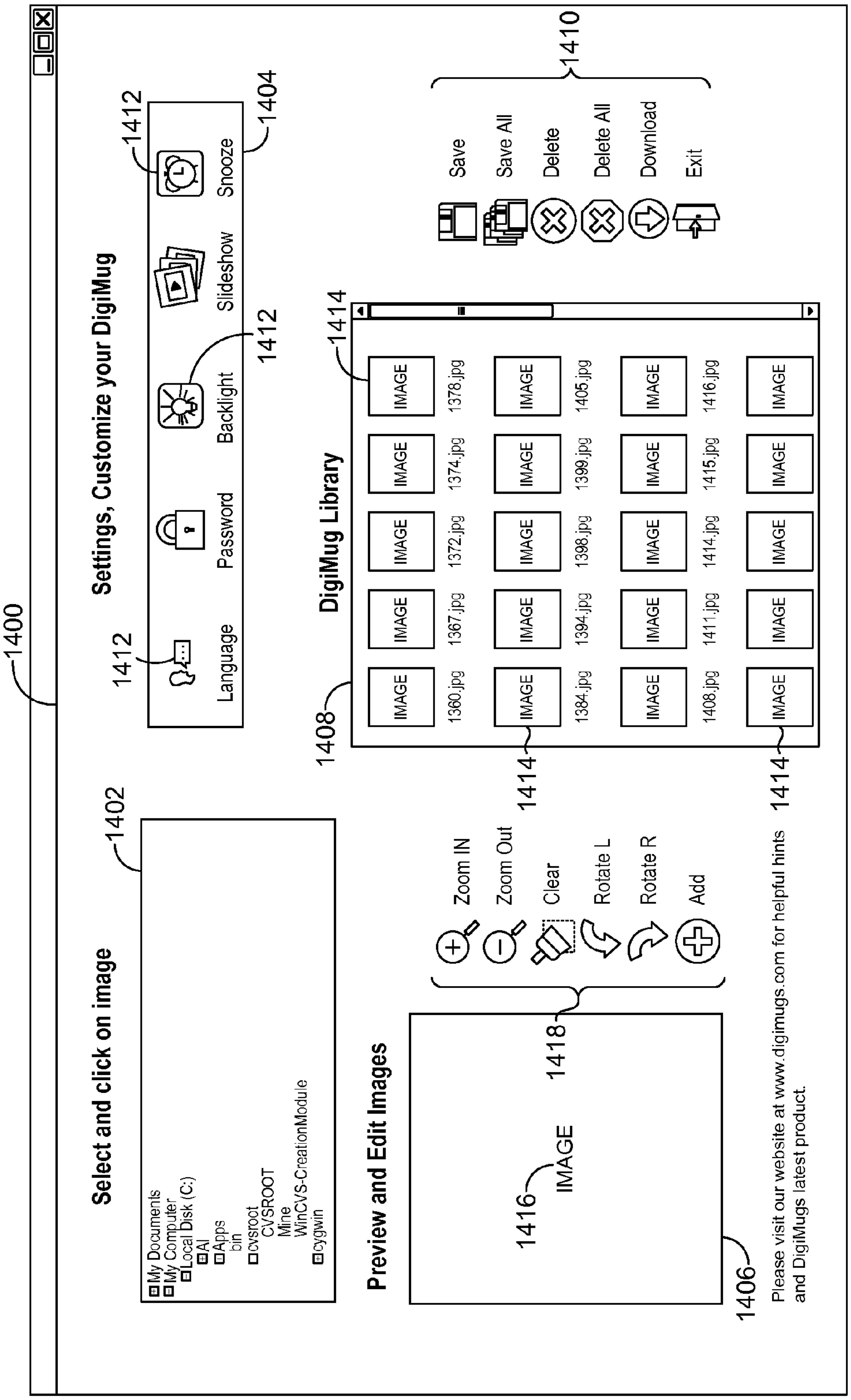
FIG. 14 is a graphical representation of one possible user interface useable to configure a beverage container for displaying an image in accordance with an embodiment of the invention.

The software package provides a user interface 1400, as depicted in exemplary form in FIG. 14, to aid in the configuration of the beverage container 10 and management of images stored thereon. It is to be understood that the illustrated user interface 1400 is one example, of which there are many, of a user interface useable in accordance with embodiments of the invention. The user interface 1400 is presented herein for exemplary purposes and is not intended to limit embodiments of the invention.

The user interface 1400 includes a navigation pane 1402, a settings bar 1404, a preview pane 1406, a library pane 1408, and a number of function buttons 1410. The navigation pane 1402 displays a memory hierarchy of the computing device to which the beverage container 10 is connected. Navigation of the computing device memory hierarchy is enabled via the navigation pane 1402 to allow selection of images, videos, or other data files to be added to the memory 40 of the control module 16.

The settings bar 1404 provides a plurality of selectable icons 1412 that, when selected, present an associated window and customizable features of the beverage container 10. As such, an icon 1412 may be selected to view and customize those features. The features include, for example, passwords, a time delay and transitions between images of a slide show, and a duration of time that is observed without motion before placing the display device 14 in standby mode as described above.

Once an image, video, or other file is selected via the navigation pane 1402, it is added to the library pane 1408 which indicates files 1414 that are or that will be stored on the memory 40 of the control module 16. Files 1414 displayed in the library pane 1408 are selectable for view in the preview pane 1406 and for execution of operations thereon via the function buttons 1410. The function buttons 1410 enable functions such as saving the files 1414 to the memory 40, deleting files 1414 from the memory 40 or from the library pane 1408, as well as downloading files 1414 to the memory 40 from the computing device.

The preview pane 1406 provides a display of an image 1416, video, or other file 1414 selected in the library pane 1408. The image 1416 may be edited using one or more control keys 1418 associated with the preview pane 1406 to adjust the presentation of the image 1416 by the display device 14.

With continued reference to FIG. 13, at a step 1306 one or more images 1316 are stored to the memory 40 using the user interface 1400. In an embodiment, the beverage container 10 is now ready for use. In another embodiment, the coupling between the beverage container 10 and the computing device also provides electrical power to charge the battery 42 of the beverage container 10. A power adapter cable (not shown) might also be provided to enable the battery 42 to be charged by plugging into a standard electrical outlet. Alternatively, the battery could be charged wirelessly via inductive charging.

At a step 1308, a liquid is disposed into the container 10. And, at a step 1310, the container 10 is moved such as by handling during filling, handing off to a customer, tilting to consume the liquid, or the like. As such, the appropriate signals are received by the control module 16 and the image 1416 is displayed on the display device 14 in accordance with the configurations provided via the user interface 1400.

With continued reference to FIGS. 1-14, an exemplary embodiment of the invention is described. Initially, a restaurateur purchases a number of the beverage containers 10. Each of the beverage containers are coupled to the restaurateur's computing device and a number of advertisement images are downloaded to their respective memories 40. The restaurateur then fills one of the beverage containers 10 with a drink ordered by a patron of her restaurant. The presence of the liquid in the container 10 and the movement of the container 10 during filling and carrying to the patron provide the necessary signals to the control module 16 to cause an advertisement image to be displayed.

The patron may view the advertisement(s) while enjoying the drink contained in the container 10. The patron might perceive an advertisement and decide to order another drink based on the advertisement. Or the patron might simply enjoy viewing the advertisement images. Periodic movements of the container 10 by the patron drinking or simply moving the container 10 cause the motion sensor 48 signals to be provided to the control module 16. The display device 14 thus continues to display the image and/or cycles through multiple images or advertisements as described above.

Upon completing her drink, the signal from the liquid sensor 46 is lost and the control module 16 discontinues display of the advertisement(s) by the display device 14. The control module 16 and/or display device 14 enter a standby mode until the signal from the liquid sensor 46 is restored. Alternatively, a delay period might be observed in which the control module 16 causes a final advertisement to be displayed for a period of time before entering a standby mode.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A beverage container comprising:

a hollow container having a closed first end, a sidewall extending from the first end and forming an open second end opposite the first end;

a display device disposed within the sidewall and having an electronic display configured to display an image;

a liquid sensor disposed proximate the closed first end and configured to sense the presence of a liquid in the container;

a motion sensor configured to sense movement of the hollow container; and a control module configured to provide an image for presentation by the display device based at least in part on signals received from the liquid sensor and the motion sensor;

wherein the control module provides the image to the display device and the display device displays the image after the control module has received both a signal from the liquid sensor indicating liquid is in the container and a signal from the motion sensor indicating movement of the container.

2. The beverage container of claim 1, further comprising one or more of a timer component for measuring a period of elapsed time and a temperature sensor for measuring a temperature of one or more of a liquid disposed in the hollow container, the hollow container, and an environment proximate to the hollow container.

3. The beverage container of claim 1, wherein the liquid sensor further comprises a pair of probes that are exposed to the interior of the hollow container to sense a change in an electrical property between the probes caused by the presence of a liquid in the container.

4. The beverage container of claim 1, wherein when the liquid sensor senses a liquid in the container a power supply circuit is completed to provide power to the control module from a battery.

5. The beverage container of claim 1, wherein the control module further comprises an integrated circuit board, a memory, a processor, and a battery, the memory configured to store one or more images.

6. The beverage container of claim 5, further comprising:

an audio output device configured to generate an audible output from an audio file stored in the memory as directed by the control module.

7. The beverage container of claim 5, further comprising a communications port in electrical communication with the control module, the communications port configured to communicatively couple the control module with an external computing device, wherein the external computing device communicates the one or more images to the control module for storage in the memory and manages a configuration of the control module's operation via the communications port.

8. The beverage container of claim 7, wherein an application is executed by the control module to aid in storing the one or more image files and management of the configuration.

9. The beverage container of claim 7, wherein the communications port comprises a USB (universal serial bus) receptacle.

10. The beverage container of claim 7, wherein the control module and display device are in an off state until initialized by connecting to the external computing device via the communications port.

11. The beverage container of claim 1, wherein:

a first signal from the liquid sensor is received by the control module when the presence of a liquid in the hollow container is sensed, the motion sensor is in an off state until activated by the control module after receipt of the first signal, a second signal from the motion sensor is received by the control module when a motion of the container is sensed, the control module displays an image on the display device after receipt of the second signal, the control module monitors for a subsequent occurrence of the second signal from the motion sensor, and when the subsequent occurrence of the second signal is not received within a period of time, the display of the image is discontinued, or when the subsequent occurrence of the second signal is received within the period of time the display of the image is maintained and the control module monitors for another occurrence of the second signal within a new period of time.

12. The beverage container of claim 11, wherein when the display of the image is discontinued, the control module continues to monitor for the second signal from the motion sensor and, when the second signal is received and the first signal from the liquid sensor indicates the presence of the liquid the image is again displayed.

13. The beverage container of claim 11, wherein when the liquid sensor no longer senses the presence of the liquid in the container it no longer provides the first signal and the display of the image is discontinued.

14. The beverage container of claim 13, wherein the control module assumes a sleep state when the liquid sensor does not provide the first signal to the control module.

15. A method for presenting an image on a beverage container, the method comprising, in a beverage container having an electronic display device disposed in a sidewall of the container, a liquid sensor, a motion sensor, and a control module:

receiving a first signal from the liquid sensor that indicates the presence of a liquid in the interior of the container;

activating the motion sensor upon receipt of the first signal;

monitoring the motion sensor for a second signal that indicates a movement of the container after receipt of the first signal;

receiving a second signal from the motion sensor indicating the presence of motion of the container;

activating the display device and displaying an image or video on the display device upon receipt of the second signal when the second signal is received.

16. The method of claim 15, further comprising:

receiving, by the control module, the image from a disparate computing device via an electronic coupling between the control module of the beverage container and the disparate computing device; and storing the image in a memory of the control module.

17. The method of claim 15, further comprising at least one of continuing to display the image on the display device for a predetermined period of time after receipt of the first signal, continuing to display the image on the display device as long as the second signal is received, and discontinuing display of the image on the display device when the second signal is not received within a predetermined the period of time or when the first signal is no longer received, wherein discontinuing display of the image on the display device includes placing the display device in a standby mode.

18. The method of claim 15, wherein the display device is in a standby mode until the both the first and second signals are received.

19. A method for advertising on a beverage container comprising:

receiving a beverage container having an electronic display device disposed in a sidewall of the container, a liquid sensor, a motion sensor, and a control module;

communicatively coupling a disparate computing device to the control module of the container;

storing an image in a memory of the control module;

disposing a consumable liquid in the container, the presence of the liquid in the container causing the liquid sensor to provide a first signal to the control module; and moving the beverage container, the movement causing the motion sensor to provide a second signal to the control module, wherein the control module provides the image stored in the memory for display by the display device in response to receiving both of the first and second signals.

20. The method of claim 19, wherein a plurality of images are stored in the memory, wherein the control module identifies a first image of the plurality of images to provide for display based on one or more criteria, and wherein the control module changes the display of the first image to a second image based on a configuration received from the computing device.

* * * * *